(12) United States Patent
Ekambaram et al.

(10) Patent No.: US 10,147,230 B2
(45) Date of Patent: *Dec. 4, 2018

(54) DYNAMIC VIDEO VISUALIZATION (71) Applicant: INTERNATIONAL BUSINESS MACHINES CORPORATION, Armonk, NY (US)

(72) Inventors: Vijay Ekambaram, Chennai (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,276

(22) Filed: Nov. 13, 2017

(65) Prior Publication Data

US 2018/0096524 A1 Apr. 5, 2018

Related U.S. Application Data

(63) Continuation of application No. 15/283,499, filed on Oct. 3, 2016, now Pat. No. 9,886,793.

(51) Int. Cl.
*G06T 17/20* (2006.01)
*G06F 17/30* (2006.01)
*G06F 3/0481* (2013.01)
*G11B 27/031* (2006.01)
*G06F 3/0354* (2013.01)
(Continued)

(52) U.S. Cl.
CPC .......... *G06T 17/20* (2013.01); *G06F 3/03547* (2013.01); *G06F 3/04815* (2013.01);
(Continued)

(58) Field of Classification Search
None
See application file for complete search history.

(56) References Cited

U.S. PATENT DOCUMENTS 7,773,813 B2 8/2010 Hua et al.
2008/0270569 A1 10/2008 McBride et al.
(Continued)

FOREIGN PATENT DOCUMENTS

WO 2005001859 8/2005
WO 2005072239 8/2005

OTHER PUBLICATIONS

Emspak, Jessee; A Touchscreen You Can Pinch, Poke and Stretch; Discovery News; Apr. 23, 2013; 2 pages.
(Continued)

*Primary Examiner* — Said Broome
(74) *Attorney, Agent, or Firm* — Schmeiser, Olsen & Watts; Mark C. Vallone (57) ABSTRACT

A method and system for improving three dimensional video visualization is provided. The method includes receiving a video file and extracting metadata and contextual analysis data of the video file. Dimensions describing attributes associated with the video file are identified and use case data comprising text data and associated metadata describing activities occurring is the video file is retrieved. The dimensions are associated with the use case data and a group of relevant dimensions are extracted from the use case data. The dimensions are correlated with the group of relevant dimensions and a group of common dimensions is extracted from the dimensions and group of relevant dimensions. Three dimensions are selected from the group of common dimensions and a three dimensional block structure illustrating the three dimensions and the remaining dimensions is generated and presented to a user via a graphical user interface.

16 Claims, 7 Drawing Sheets (51) Int. Cl.
*G06F 3/0484* (2013.01)
*G06F 3/0488* (2013.01)

(52) U.S. Cl.
CPC .... *G06F 3/04842* (2013.01); *G06F 17/30061* (2013.01); *G11B 27/031* (2013.01); *G06F 3/0488* (2013.01); *G06T 2200/04* (2013.01)

(56) References Cited

U.S. PATENT DOCUMENTS

2009/0064051 A1* 3/2009 Furht ................. G06F 3/04815
 715/848
2013/0218688 A1* 8/2013 Roos ................. G06F 17/30061
 705/14.69

OTHER PUBLICATIONS

Forman, George; An Extensive Empirical Study of Feature Selection Metrics for Text Classification; Journal of Machine Learning Research 3; Mar. 2003; pp. 1289-1305.

Gemotion Screen; Retrieved from the Internet on Apr. 24, 2016; URL: http://www.isi.imi.i.u-tokyo.act/~niyama/projects/proj_gemotion_en.html; 3 pages.

Nguyen, Xuan Vinh; Effective Global Approaches for Mutual Information Based Feature Selection; Proceedings of the 20th ACM SIGKDD International Conference on Knowledge Discovery and Data Mining; Aug. 24-27, 2014; pp. 512-521.

Technology . . . or magic? Samsung shows off video of transparent, flexible screen—with 3D so real it looks like you can touch it; Dec. 7, 2011; Daily Mail.com; Retrieved from the Internet Apr. 24, 2016; URL: http://www.dailymail.co.uk/sciencetech/article-2070741/Samsungs-trans . . . ; 21 pages.

Yazdani, Ashkan; Multimedia content analysis for emotional characterization of music video clips; EURASIP Journal on Image and Video Processing; Apr. 30, 2013; 9 pages.

Friedman, Mark J.; List of IBM Patents or patent Applications Treated as Related; Nov. 13, 2017; 1 page.

* cited by examiner

DYNAMIC VIDEO VISUALIZATION

This application is a continuation application claiming priority to Ser. No. 15/283,499 filed Oct. 3, 2016.

FIELD

The present invention relates generally to a method for generating and presenting a three dimensional block structure associated with video file and in particular to a method and associated system for improving video frame selection in combination with overlay video presentation information.

BACKGROUND

Accurately identifying visual data for presentation typically includes an inaccurate process with little flexibility. Switching between various video interfaces with respect to selecting associated video may include a complicated process that may be time consuming and require a large amount of resources. Accordingly, there exists a need in the art to overcome at least some of the deficiencies and limitations described herein above.

SUMMARY

A first aspect of the invention provides a three dimensional video visualization improvement method comprising: receiving, by a computer processor of a hardware device, a video file; extracting, by the computer processor from the video file, metadata and contextual analysis data associated with audio and video data of the video file; identifying, by the processor, dimensions describing attributes associated with the video file; retrieving, by the processor, use case data comprising text data and associated metadata describing activities occurring is the video file; associating, by the processor, the dimensions with the use case data; extracting from the use case data, by the processor based on results of the associating, a group of relevant dimensions describing attributes associated with the use case data; correlating, by the processor, the dimensions with the group of relevant dimensions; extracting from the dimensions and the group of relevant dimensions, by the processor based on results of the correlating, a group of common dimensions; selecting, by the processor, three dimensions from the group of common dimensions, wherein all remaining dimensions of the group of common dimensions are designated as filter dimensions; generating, by the processor based on the three dimensions and the remaining dimensions, a three dimensional block structure illustrating the three dimensions and the remaining dimensions; and presenting, by the processor via a graphical user interface, the three dimensional block structure to a user.

A second aspect of the invention provides a computer program product, comprising a computer readable hardware storage device storing a computer readable program code, the computer readable program code comprising an algorithm that when executed by a processor of a hardware device implements a three dimensional video visualization improvement method, the method comprising: receiving, by the computer processor, a video file; extracting, by the computer processor from the video file, metadata and contextual analysis data associated with audio and video data of the video file; identifying, by the processor, dimensions describing attributes associated with the video file; retrieving, by the processor, use case data comprising text data and associated metadata describing activities occurring is the video file; associating, by the processor, the dimensions with the use case data; extracting from the use case data, by the processor based on results of the associating, a group of relevant dimensions describing attributes associated with the use case data; correlating, by the processor, the dimensions with the group of relevant dimensions; extracting from the dimensions and the group of relevant dimensions, by the processor based on results of the correlating, a group of common dimensions; selecting, by the processor, three dimensions from the group of common dimensions, wherein all remaining dimensions of the group of common dimensions are designated as filter dimensions; generating, by the processor based on the three dimensions and the remaining dimensions, a three dimensional block structure illustrating the three dimensions and the remaining dimensions; and presenting, by the processor via a graphical user interface, the three dimensional block structure to a user.

A third aspect of the invention provides a hardware device comprising a computer processor coupled to a computer-readable memory unit, the memory unit comprising instructions that when executed by the computer processor implements a three dimensional video visualization improvement method comprising: receiving, by the computer processor, a video file; extracting, by the computer processor from the video file, metadata and contextual analysis data associated with audio and video data of the video file; identifying, by the processor, dimensions describing attributes associated with the video file; retrieving, by the processor, use case data comprising text data and associated metadata describing activities occurring is the video file; associating, by the processor, the dimensions with the use case data; extracting from the use case data, by the processor based on results of the associating, a group of relevant dimensions describing attributes associated with the use case data; correlating, by the processor, the dimensions with the group of relevant dimensions; extracting from the dimensions and the group of relevant dimensions, by the processor based on results of the correlating, a group of common dimensions; selecting, by the processor, three dimensions from the group of common dimensions, wherein all remaining dimensions of the group of common dimensions are designated as filter dimensions; generating, by the processor based on the three dimensions and the remaining dimensions, a three dimensional block structure illustrating the three dimensions and the remaining dimensions; and presenting, by the processor via a graphical user interface, the three dimensional block structure to a user.

The present invention advantageously provides a simple method and associated system capable of accurately identifying visual data for presentation.

DETAILED DESCRIPTION

Figure 1:
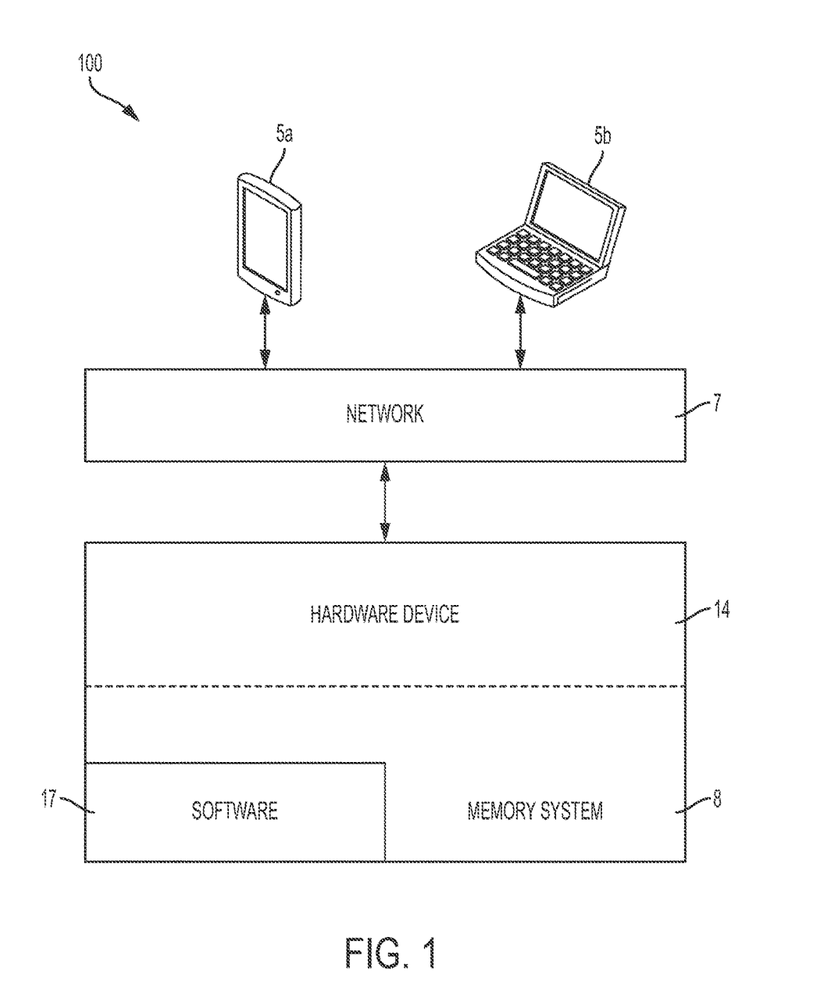
FIG. 1 illustrates a system for generating a three dimensional block structure associated with video file for improving video frame selection for overlaying video presentation information, in accordance with embodiments of the present invention.

FIG. 1 illustrates a system 100 for generating a three dimensional block structure associated with video file for improving video frame selection for overlaying video presentation information, in accordance with embodiments of the present invention. System 100 enables a user based dynamic video reorganization and visualization process such that software and associated specialized hardware (as described, infra) analyze video contents and associated meta-data (of video data) for generating suggestions associated with required dimensions describing use case text.

System 100 of FIG. 1 includes a hardware device 5 connected through a network 7 to a hardware system 14. Hardware device 5 and hardware system 14 each may comprise an embedded mobile device. An embedded mobile device is defined herein as a dedicated device or computer comprising a combination of computer hardware and software (fixed in capability or programmable) specifically designed for executing a specialized function. Programmable embedded computers or devices may comprise specialized programming interfaces. In one embodiment, hardware device 5 and hardware system 14 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-4. The specialized discrete non-generic analog, digital, and logic based circuitry may include proprietary specially designed components (e.g., a specialized integrated circuit, such as for example an Application Specific Integrated Circuit (ASIC) designed for only implementing an automated process for generating a three dimensional block structure associated with video file for improving video frame selection for overlaying video presentation information. Hardware system 14 includes a memory system 8 and software 17. Hardware system 14 and hardware device 5 may comprise mobile devices such as, inter alia, as smart phones, pagers, IOT devices, etc. The memory system 8 may include a single memory system. Alternatively, the memory system may include a plurality of memory systems. Network 7 may include any type of network including, inter alia, a local area network, (LAN), a wide area network (WAN), the Internet, a wireless network, etc.

System 100 is configured to execute a process for dynamically reorganizing an input video file for generation of an associated three dimensional cube for visualization and specified storage. The three dimensional cube is generated by correlating features extracted from a use-case (i.e., via text & metadata) with features extracted from the video file and visually presenting the correlations in the three dimensional cube structure. An axis of the dimensional cube structure in combination with a filter axis represent predicted common features extracted from the correlations. The aforementioned process enables use case based reorganization of the video files presented as an axis of the three dimensional visualization cube structure for storage. The axis comprises predicted common features between the use case and the video files. The following steps describe a process for generating and storage the three dimensional cube structure:

1. Software and associated specialized hardware installed within a video server (e.g., hardware device 14 of FIG. 1) extracts information from a video file (e.g., meta-data, contextual analysis of spoken and visual contents, etc.) and differing dimensions (associated with the information) are identified.
2. Use case data (describing activities occurring in the video file) is retrieved by the software (and associated hardware) and feature extraction algorithms are executed with respect to the use case data. In response, necessary dimensions (associated with the use case data) are obtained by correlating available dimensions with features available within the use case data (i.e., text) resulting in discovery of a set of dimensions required for the associated use case.
3. Three dimensions are selected from the set of dimensions and all remaining dimensions are designated as filter dimensions.
4. The video file is reorganized as a three dimensional cube block structure based on the selected three dimensions and associated filter dimensions. The three dimensions are configured for forming the three dimensional cube block structure and the remaining filter dimensions are configured for filtering video contents of the video file. The three dimensional cube block structure is formed based on the availability of video contents (of the video file) for the selected dimensions.

The following steps describe a process for retrieving associated use case based video sections (of the video file) and generating associated recommendations retrieved based on visualization of the three dimensional cube block structure.

1. One or more blocks are selected from the three dimensional cube block structure. The one or more block may be associated with user recommendations and comments.
2. The Software and associated specialized hardware generates a playlist indexing the one or more blocks based on a determined importance and results of correlating the available dimensions with the features available within the use case data.

The following steps describe a process for dynamically reorganizing overlay advertisements (with respect to the video file) based on the use case specific three dimensional cube block structure (i.e. runtime positioning of advertisements within video sections selected and displayed within the three dimensional cube block structure) to increase a likeliness of advertisement hits:

1. Overlay advertisements are attached to the video file as dynamic metadata.
2. The overlay advertisements are dynamically positioned within various blocks of the three dimensional cube block structure based on a user profile and past history. The advertisements are positioned in accordance with positions likely to be viewed by a user.

The aforementioned three dimensional cube block structure is designed to improve the way a computer (i.e., hardware device 14) stores, retrieves, and presents data within a memory structure by storing a reorganized video file as a three dimensional cube structure for visualizing specific portions of the video file and attaching overlay data (e.g., advertisements) in a specific manner.

The following example describes a process for analyzing a use case (i.e., a roadside accident in the evening for determining dimensions and associated correlations. In response to the determined use case, software and associated hardware enables a process for identifying associated dimensions such as, inter alia:

1. A speed of vehicles.
2. A time dimension.
3. A location dimension.
4. Traffic congestion associated with of the area of the accident.

Based on the determined dimensions, the software and associated hardware automatically selects three priority dimensions (e.g., speed of vehicles, time dimension, and location dimension) and plots associated video blocks (associated with the three selected dimensions) with respect to three axis. All remaining dimensions are plotted with respect to filter criteria. Additionally, the dimensions are identified from each video frame and if an associated dimension value is identified, it is considered a 1 and if an associated dimension value not determined to be in a frame it is be considered a 0. The following chart illustrates located dimensions (i.e., comprising a value of 1) for enabling a dimension correlation process.

|  | Video Frame 1 | Video Frame 2 | Video Frame 3 | Video Frame 4 |
| --- | --- | --- | --- | --- |
| Time | 1 | 1 | 1 | 1 |
| Location | 1 | 1 | 1 | 1 |
| Vehicle | 0 | 0 | 0 | 1 |
| Human | 0 | 0 | 1 | 1 |
| Speed | 0 | 0 | 0 | 1 |

Figure 2:
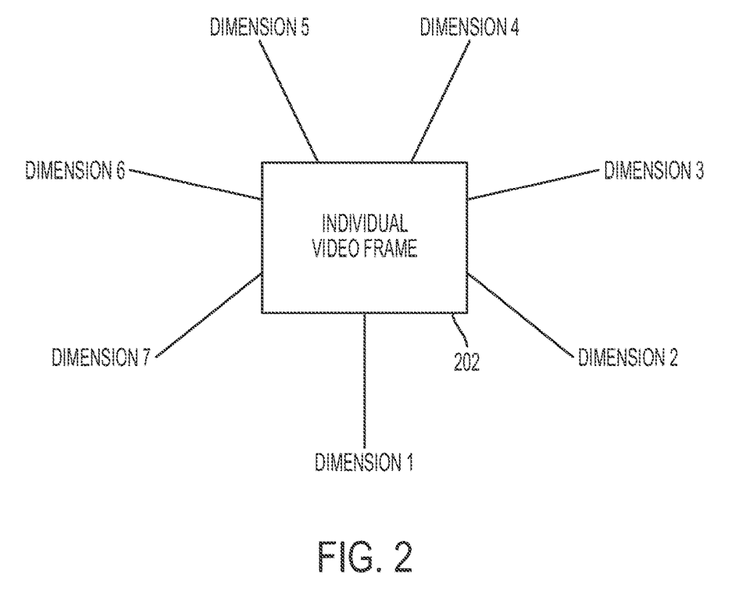
FIG. 2 illustrates an individual video frame and associated dimensions, in accordance with embodiments of the present invention.

FIG. 2 illustrates an individual video frame 202 and associated dimensions (dimension 1 . . . dimension 7), in accordance with embodiments of the present invention. Video frame 202 is associated with a video frame contextual analysis process associated with presentation of more than 24 subsequent images per second. Each of the images comprises a video frame. The aforementioned process (described with respect to FIG. 1) is configured to extract information from each frame and generate differing dimensions (i.e., dimension 1 . . . dimension 7). The extracted information may include a time and date of video frame capture, a location of video capture (i.e., metadata information), contextual information from each video frame, audio contents associated with each frame, etc.

Figure 3:
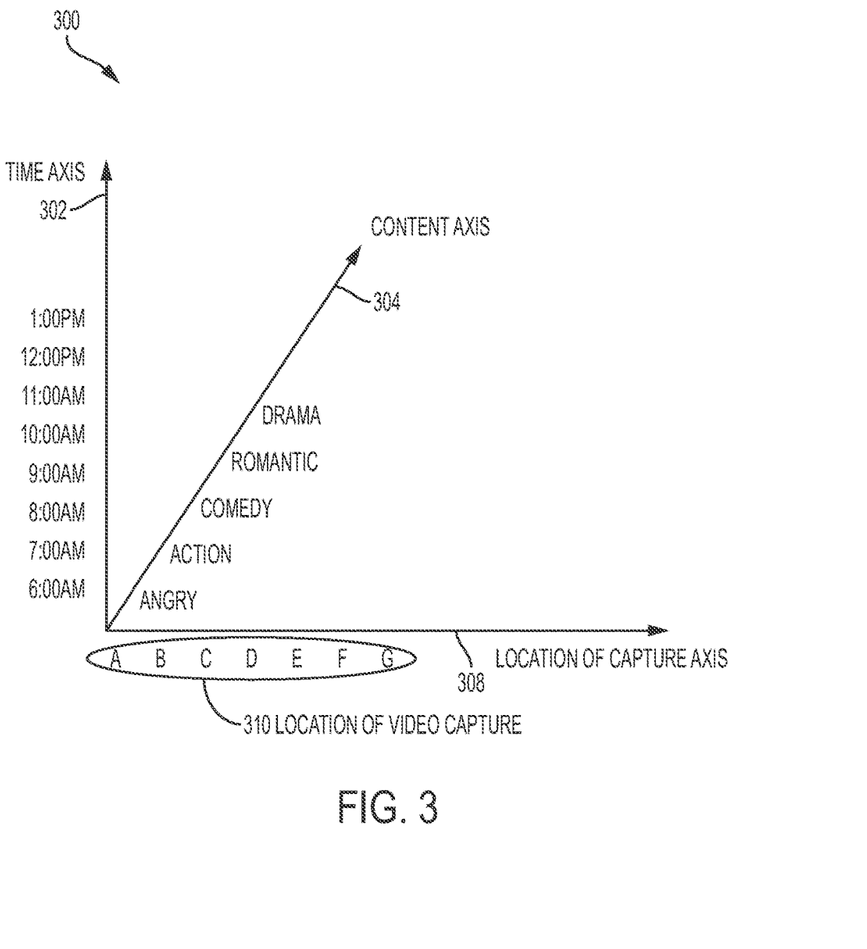
FIG. 3 illustrates a graph, in accordance with embodiments of the present invention.

FIG. 3 illustrates a graph 300, in accordance with embodiments of the present invention. Graph 300 illustrates three selected dimensions for display within a video file represented by a three dimensional cube block structure. The three dimensions include a time axis dimension 302, a context axis dimension 304, and a location of capture axis dimension 308 (comprising a location of video capture 310).

Figure 4:
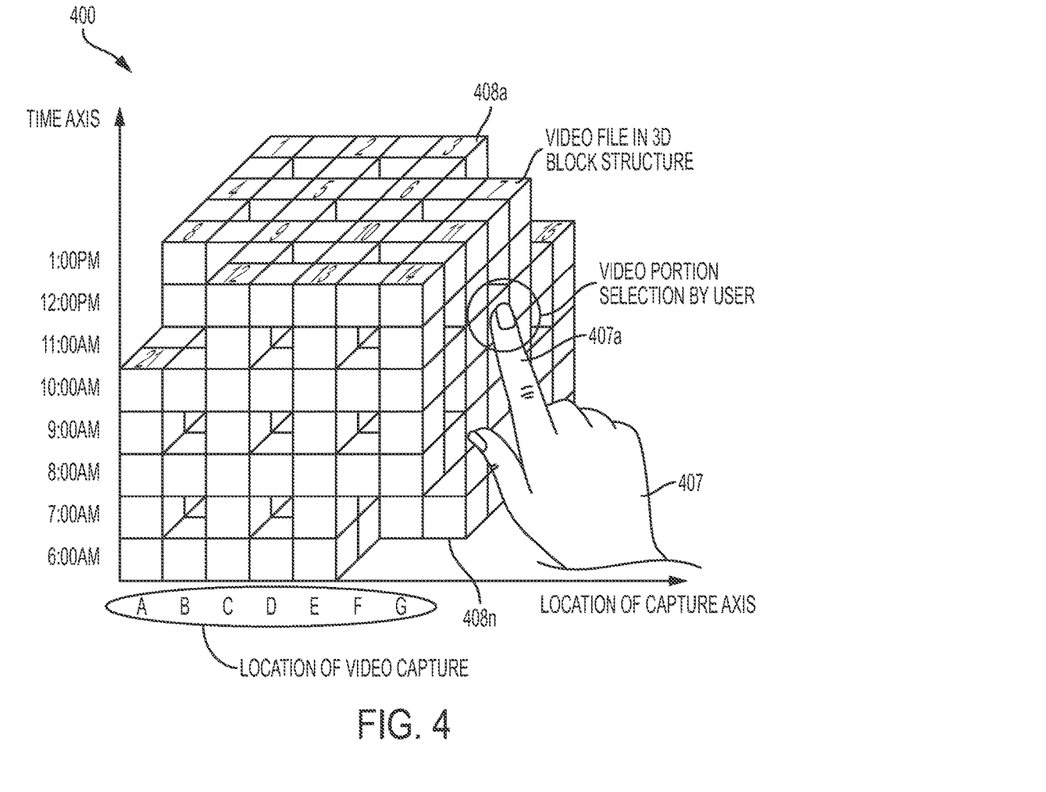
FIG. 4 illustrates a three dimensional cube structure generated with respect to the graph of FIG. 3, in accordance with embodiments of the present invention.

FIG. 4 illustrates a three dimensional cube structure 400 generated with respect to graph 300 of FIG. 3, in accordance with embodiments of the present invention. Three dimensional cube structure 400 illustrates a video file as three dimensional cube structure 400. FIG. 4 illustrates a user 407 selecting one or more blocks (of blocks 408a . . . 408n) with respect to playback of video contents of the video file. A structure of three dimensional cube structure 400 is transparent such that user 407 may select any portion (of portions 408a . . . 408n) of the video file. Three dimensional cube structure 400 is generated based on content availability with respect to selected dimensions. A user may select one or more video portions (via usage of a finger 407a) for playback. Three dimensional cube structure 400 allows user 407 to apply further filtering and drilling of video portions 408a . . . 408n by selecting additional dimensions.

Figure 5:
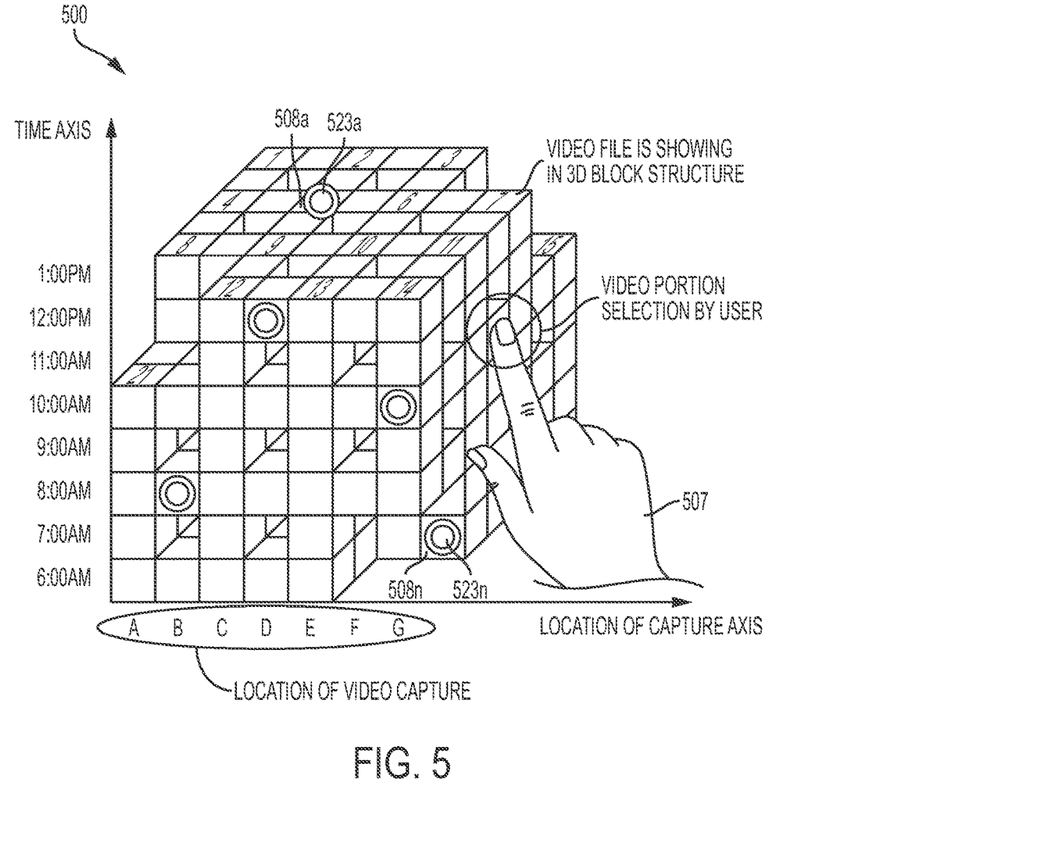
FIG. 5 illustrates a three dimensional cube structure generated with respect to the three dimensional cube structure of FIG. 4, in accordance with embodiments of the present invention.

FIG. 5 illustrates a three dimensional cube structure 500 generated with respect to three dimensional cube structure 400 of FIG. 4, in accordance with embodiments of the present invention. In contrast to three dimensional cube structure 400 of FIG. 4, three dimensional cube structure 500 of FIG. 5 illustrates a positioning of overlay advertisements 523a . . . 523n with respect to some of video portions 508a . . . 508n. Overlay advertisements 523a . . . 523n are not statically attached to video portions 508a . . . 508n. Overlay advertisements 523a . . . 523n are provided as meta-data files that are loosely coupled with video portions 508a . . . 508n. Software and associated hardware are enabled to predict relevant video portion blocks (of video portions 508a . . . 508n) with respect to user 507. The prediction is generated based on a user's past view history and video portion block hits via additional users comprising similar profiles. Upon completion of identification of the video portion blocks, overlay advertisements 523a . . . 523n are positioned within associated video portion blocks such that when user 507 selects and view the associated video portion blocks, associated overlay advertisements (of overlay advertisements 523a . . . 523n) are displayed within contents of the associated video portion blocks.

The following implementation example enabled by the system 100 of FIG. 1 describes a process implemented via a video viewing system. The video viewing system requires a quick visualization of video content and information retrieval, such that an entire video file may be quickly viewed by an administrator and a quick decision with respect to actions in the video may be enabled. Therefore, the video file is generated based on multiple cube blocks plotted with respect to three axis (i.e., three dimensional cube structure 500) thereby allowing an administrator to analyze a concentration of video blocks with respect to the three axis. Three dimensional cube structure 500 a (heat map) enables the administrator to understand a concentration of video blocks with respect to the three axis. For example, the following dimensions are identified (via a frame by frame video analysis) from a video file:

1. A location.
2. A date and time (Morning, evening, night etc.).
3. Weather conditions (rainy, sunny, cloudy, etc.).
4. Context (e.g., play games, etc.).
5. Emotion.
6. Object mobility.
7. A concentration of people.

In response, the administrator may select any three of the dimensions. Alternatively, software (and associated hardware) may be enabled to automatically select three dimensions based on a given use case and accordingly the video blocks will be plotted with respect to three axis. All remaining dimensions may be designated as filters so that the video content may be restricted to three axis. Therefore, when the video blocks are plotted with respect to three axis a user may understand a concentration of video blocks with respect to the three axis. The aforementioned video blocks plotted with respect to three axis allow the administrator to view a distribution of the video blocks in a three dimensional map allowing the administrator to understand an entire video file at a glance. For example:

1. When and which location movement of any object is detected.
2. Emotion changes with respect to people when the object movement is detected.

Therefore, the aforementioned process allows for quick visualization of a video file in a three dimensional diagram for a given use case, so that a user may easily understand a concentration of video blocks and associated relationships with selected dimensions. For example, a use case may comprise determining suspicious activities within a retail center via video retrieved from a video camera. The following three dimensions are selected:

Dimension 1: Time
Dimension 2: Location
Dimension 3: Facial data of individuals associated with the use case.

Figure 6:
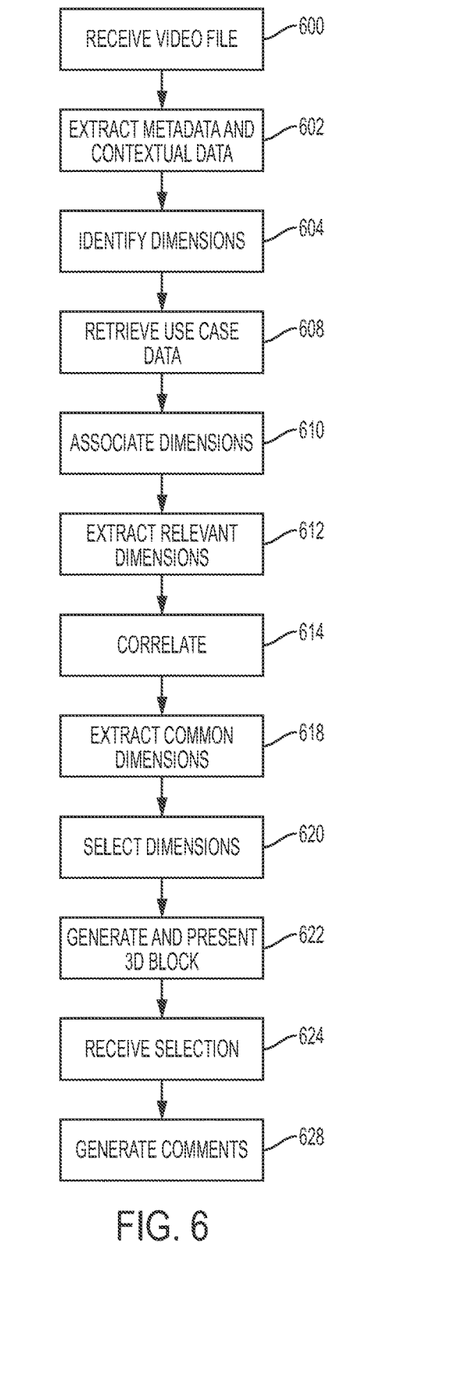
FIG. 6 illustrates an algorithm detailing a process flow enabled by the system of FIG. 1 for generating a three dimensional block structure associated with video file for improving video frame selection for overlaying video presentation information, in accordance with embodiments of the present invention.

Based on the selected three dimensions, a three dimensional cube structure is dynamically generated from the retail center video files for analysis FIG. 6 illustrates an algorithm detailing a process flow enabled by system 100 of FIG. 1 for generating a three dimensional block structure associated with video file for improving video frame selection for overlaying video presentation information, in accordance with embodiments of the present invention. Each of the steps in the algorithm of FIG. 4 may be enabled and executed in any order by a computer processor(s) executing computer code. Additionally, each of the steps in the algorithm of FIG. 6 may be enabled and executed independently by hardware device 14 of FIG. 1. Alternatively, each of the steps in the algorithm of FIG. 4 may be enabled and executed in combination by hardware devices 5a or 5b and hardware device 14 of FIG. 1. In step 600, a video file is received by a hardware device. In step 602, metadata and contextual analysis data (associated with audio and video data of the video file) are extracted from the video file. In step 604, dimensions describing attributes associated with the video file are identified. In step 608, use case data comprising text data and associated metadata (describing activities occurring is the video file) is retrieved. In step 610, the dimensions are associated with the use case data. In step 612, a group of relevant dimensions (describing attributes associated with the use case data) is extracted from the use case data based on results of step 610. In step 614, the dimensions are correlated with the group of relevant dimensions. All video blocks of the three dimensional block structure may be indexed based on the correlation. In step 618, a group of common dimensions is extracted from the dimensions and the group of relevant dimensions based on results of step 614. In step 620, three dimensions are selected from the group of common dimensions. All remaining dimensions of the group of common dimensions are designated as filter dimensions. In step 622, a three dimensional block structure illustrating the three dimensions and the remaining dimensions is generated and presented via a graphical user interface (e.g., comprising a touch screen portion). In step 624, a selection for at least one video block of the three dimensional block structure is selected. In step 628, comments associated with recommendations for the at least one video block are generated based on input from the user. Additionally, overlay advertisements may be retrieved from the metadata extracted in step 602. The overlay advertisements may be dynamically positioned (based on the three dimensions) within specified video blocks of the three dimensional block structure.

Figure 7:
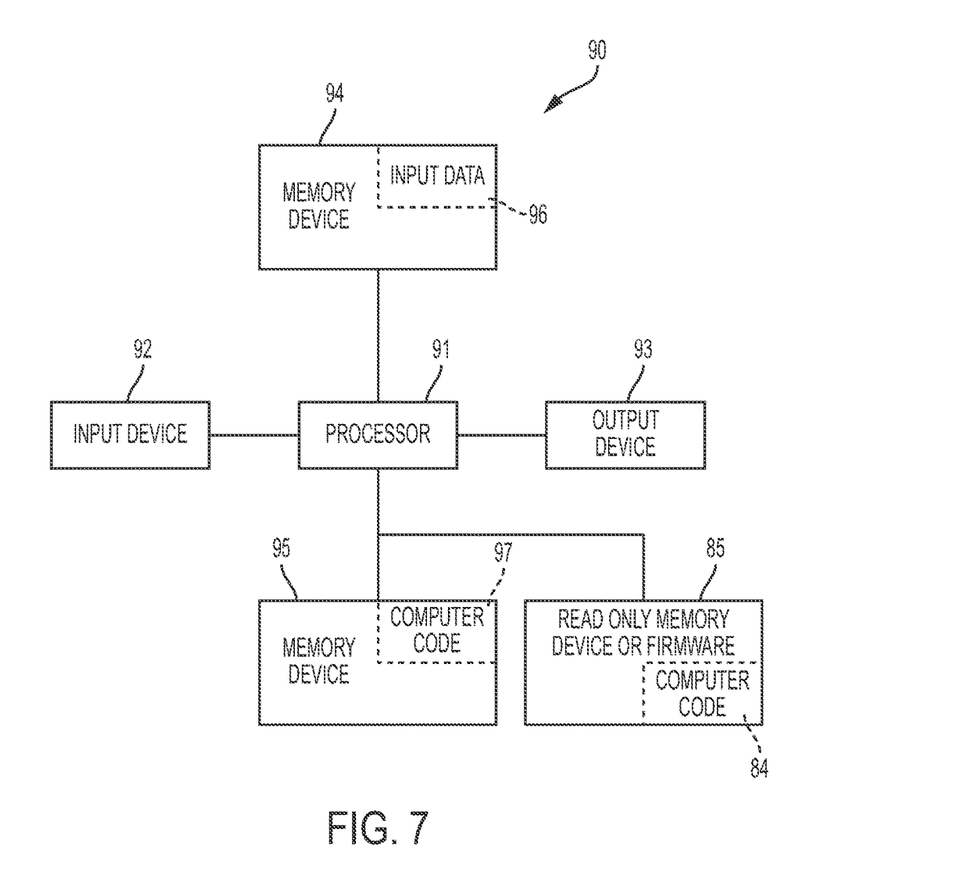
FIG. 7 illustrates a computer system used by the system of FIG. 1 for enabling a process for generating a three dimensional block structure associated with video file for improving video frame selection for overlaying video presentation information, in accordance with embodiments of the present invention.

FIG. 7 illustrates a computer system 90 (e.g., hardware devices 5a, 5b, and 14) used by or comprised by the system of FIG. 1 for generating a three dimensional block structure associated with video file for improving video frame selection for overlaying video presentation information, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 7 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 6) for generating a three dimensional block structure associated with video file for improving video frame selection for overlaying video presentation information. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 6) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to generate a three dimensional block structure associated with video file for improving video frame selection for overlaying video presentation information. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for generating a three dimensional block structure associated with video file for improving video frame selection for overlaying video presentation information. In another embodiment, the invention provides a business method that performs the process steps of the invention on a subscription, advertising, and/or fee basis. That is, a service supplier, such as a Solution Integrator, could offer to enable a process for generating a three dimensional block structure associated with video file for improving video frame selection for overlaying video presentation information. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A three dimensional video visualization improvement method comprising:
    identifying, by a computer processor of a hardware device, dimensions describing attributes associated with a video file comprising metadata and contextual analysis data associated with audio and video data of said video file;
    retrieving, by said processor, use case data comprising text data and associated metadata describing activities occurring is said video file;
    associating, by said processor, said dimensions with features of said use case data;
    extracting from said use case data, by said processor based on results of said associating, a group of relevant dimensions describing attributes associated with said use case data;
    correlating, by said processor, said dimensions with said group of relevant dimensions;
    extracting from said dimensions and said group of relevant dimensions, by said processor based on results of said correlating, a group of common dimensions;
    selecting, by said processor, three dimensions from said group of common dimensions, wherein all remaining dimensions of said group of common dimensions are designated as filter dimensions, wherein said three dimensions comprise a time axis dimension, a context axis dimension, and a location of capture axis dimension;
    generating, by said processor based on said three dimensions and said remaining dimensions, a three dimensional block structure comprising a reorganized version of said video file and illustrating said three dimensions and said remaining dimensions;
    presenting, by said processor via a graphical user interface, said three dimensional block structure to a user in combination with a time based axis and a video capture location based axis, wherein said three dimensional block structure comprises a plurality of viewable transparent video blocks in contact with at least one additional video block of said plurality of viewable transparent video blocks, wherein said plurality of viewable transparent video blocks allow additional transparent video blocks of said plurality of viewable transparent video blocks to be viewable through each other;
    retrieving, by said processor, overlay advertisements from said metadata;
    dynamically coupling for runtime viewing, by said processor based on said three dimensions and a profile and a past history of said user, said overlay advertisements as dynamic metadata within specified video blocks of said three dimensional block structure such that representations for said overlay advertisements are viewable with associated transparent video blocks of said viewable transparent video blocks;
    receiving, by said processor from said user via finger activation of a touch screen portion of said GUI, a selection for at least one video block of said three dimensional block structure;
    generating, by said processor based on input from the user, comments associated with recommendations for said at least one video block; and
    generating, by said processor based on a determined importance and results of said associating, a playlist indexing said plurality of viewable transparent video blocks.

2. The method of claim 1, further comprising:
    indexing, by said processor based on said results of said correlating, all video blocks of said three dimensional block structure.

3. The method of claim 1, wherein said dimensions comprise attributes selected from the group consisting of location attributes, date and time based attributes, weather condition based attributes, context based attributes, emotion based attributes, and object mobility based attributes.

4. The method of claim 1, wherein said selecting said three dimensions is performed based on user input.

5. The method of claim 1, wherein said selecting said three dimensions is performed automatically by said processor based on said use case data.

6. The method of claim 1, further comprising:
    providing at least one support service for at least one of creating, integrating, hosting, maintaining, and deploying computer-readable code in the control hardware, said code being executed by the computer processor to implement: said identifying, said retrieving, said associating, said extracting said group of relevant dimensions, said correlating, said extracting said group of common dimensions, said selecting, said generating, and said presenting.

7. A computer program product, comprising a non-transitory computer readable hardware storage device storing a computer readable program code, said computer readable program code comprising an algorithm that when executed by a processor of a hardware device implements a three dimensional video visualization improvement method, said method comprising:
    identifying, by said processor, dimensions describing attributes associated with a video file comprising metadata and contextual analysis data associated with audio and video data of said video file;
    retrieving, by said processor, use case data comprising text data and associated metadata describing activities occurring is said video file;

associating, by said processor, said dimensions with features of said use case data;
extracting from said use case data, by said processor based on results of said associating, a group of relevant dimensions describing attributes associated with said use case data;
correlating, by said processor, said dimensions with said group of relevant dimensions;
extracting from said dimensions and said group of relevant dimensions, by said processor based on results of said correlating, a group of common dimensions;
selecting, by said processor, three dimensions from said group of common dimensions, wherein all remaining dimensions of said group of common dimensions are designated as filter dimensions, wherein said three dimensions comprise a time axis dimension, a context axis dimension, and a location of capture axis dimension;
generating, by said processor based on said three dimensions and said remaining dimensions, a three dimensional block structure comprising a reorganized version of said video file and illustrating said three dimensions and said remaining dimensions;
presenting, by said processor via a graphical user interface, said three dimensional block structure to a user in combination with a time based axis and a video capture location based axis, wherein said three dimensional block structure comprises a plurality of viewable transparent video blocks in contact with at least one additional video block of said plurality of viewable transparent video blocks, wherein said plurality of viewable transparent video blocks allow additional transparent video blocks of said plurality of viewable transparent video blocks to be viewable through each other;
retrieving, by said processor, overlay advertisements from said metadata; and
dynamically coupling for runtime viewing, by said processor based on said three dimensions and a profile and a past history of said user, said overlay advertisements as dynamic metadata within specified video blocks of said three dimensional block structure such that representations for said overlay advertisements are viewable with associated transparent video blocks of said viewable transparent video blocks;
receiving, by said processor from said user via finger activation of a touch screen portion of said GUI, a selection for at least one video block of said three dimensional block structure;
generating, by said processor based on input from the user, comments associated with recommendations for said at least one video block; and
generating, by said processor based on a determined importance and results of said associating, a playlist indexing said plurality of viewable transparent video blocks.

8. The computer program product of claim 7, wherein said method further comprises:
indexing, by said processor based on said results of said correlating, all video blocks of said three dimensional block structure.

9. The computer program product of claim 7, wherein said dimensions comprise attributes selected from the group consisting of location attributes, date and time based attributes, weather condition based attributes, context based attributes, emotion based attributes, and object mobility based attributes.

10. The computer program product of claim 7, wherein said selecting said three dimensions is performed based on user input.

11. The computer program product of claim 7, wherein said selecting said three dimensions is performed automatically by said processor based on said use case data.

12. A hardware device comprising a computer processor coupled to a computer-readable memory unit, said memory unit comprising instructions that when executed by the computer processor implements a three dimensional video visualization improvement method comprising:
identifying, by said processor, dimensions describing attributes associated with a video file comprising metadata and contextual analysis data associated with audio and video data of said video file;
retrieving, by said processor, use case data comprising text data and associated metadata describing activities occurring is said video file;
associating, by said processor, said dimensions with features of said use case data;
extracting from said use case data, by said processor based on results of said associating, a group of relevant dimensions describing attributes associated with said use case data;
correlating, by said processor, said dimensions with said group of relevant dimensions;
extracting from said dimensions and said group of relevant dimensions, by said processor based on results of said correlating, a group of common dimensions;
selecting, by said processor, three dimensions from said group of common dimensions, wherein all remaining dimensions of said group of common dimensions are designated as filter dimensions, wherein said three dimensions comprise a time axis dimension, a context axis dimension, and a location of capture axis dimension;
generating, by said processor based on said three dimensions and said remaining dimensions, a three dimensional block structure comprising a reorganized version of said video file and illustrating said three dimensions and said remaining dimensions;
presenting, by said processor via a graphical user interface, said three dimensional block structure to a user in combination with a time based axis and a video capture location based axis, wherein said three dimensional block structure comprises a plurality of viewable transparent video blocks in contact with at least one additional video block of said plurality of viewable transparent video blocks, wherein said plurality of viewable transparent video blocks allow additional transparent video blocks of said plurality of viewable transparent video blocks to be viewable through each other;
retrieving, by said processor, overlay advertisements from said metadata;
dynamically coupling for runtime viewing, by said processor based on said three dimensions and a profile and a past history of said user, said overlay advertisements as dynamic metadata within specified video blocks of said three dimensional block structure such that representations for said overlay advertisements are viewable with associated transparent video blocks of said viewable transparent video blocks;
receiving, by said processor from said user via finger activation of a touch screen portion of said GUI, a selection for at least one video block of said three dimensional block structure;

generating, by said processor based on input from the user, comments associated with recommendations for said at least one video block; and generating, by said processor based on a determined importance and results of said associating, a playlist indexing said plurality of viewable transparent video blocks.

13. The hardware device of claim 12, wherein said method further comprises:

indexing, by said processor based on said results of said correlating, all video blocks of said three dimensional block structure.

14. The hardware device of claim 12, wherein said dimensions comprise attributes selected from the group consisting of location attributes, date and time based attributes, weather condition based attributes, context based attributes, emotion based attributes, and object mobility based attributes.

15. The hardware device of claim 12, wherein said selecting said three dimensions is performed based on user input.

16. The hardware device of claim 12, wherein said selecting said three dimensions is performed automatically by said processor based on said use case data.

* * * * *